(12) United States Patent
Do et al.

(10) Patent No.: US 11,871,047 B2
(45) Date of Patent: Jan. 9, 2024

(54) SYSTEM AND METHOD FOR ADAPTIVE LIVE VIDEO STREAMING BASED ON DISTORTION ESTIMATION USING MULTILAYER PERCEPTRON NEURAL NETWORK

(71) Applicant: VIETTEL GROUP, Ha Noi (VN)

(72) Inventors: Truong Xuan Do, Ha Noi (VN); Thai Binh Nguyen, Ha Noi (VN); Huu Tung Dang, Ha Noi (VN); Manh Linh Nguyen, Ha Noi (VN); Minh Tuan Vu, Ha Noi (VN)

(73) Assignee: VIETTEL GROUP, Ha Noi (VN)

( * ) Notice: Subject to any disclaimer, the term of this patent is extended or adjusted under 35 U.S.C. 154(b) by 0 days.

(21) Appl. No.: 18/071,709

(22) Filed: Nov. 30, 2022

(65) Prior Publication Data

US 2023/0171439 A1    Jun. 1, 2023

(30) Foreign Application Priority Data

Nov. 30, 2021   (VN) .............................. 1-2021-07681

(51) Int. Cl.
  *H04N 21/2187*   (2011.01)
  *H04N 21/2385*   (2011.01)
  *H04N 21/24*     (2011.01)
  *H04N 21/234*    (2011.01)

(52) U.S. Cl.
  CPC ..... *H04N 21/2187* (2013.01); *H04N 21/2385* (2013.01); *H04N 21/23418* (2013.01); *H04N 21/2402* (2013.01)

(58) Field of Classification Search
  CPC ......... H04N 21/2187; H04N 21/23418; H04N 21/2385; H04N 21/2402
  See application file for complete search history.

(56) References Cited

U.S. PATENT DOCUMENTS

2019/0041842 A1* 2/2019 Cella ...................... G06N 3/088
2019/0379683 A1* 12/2019 Overby ............... H04W 12/122

* cited by examiner

*Primary Examiner* — Nnenna N Ekpo
(74) *Attorney, Agent, or Firm* — patenttm.us

(57) ABSTRACT

A system and method for live video streaming over tactical wireless networks based on distortion estimation using multilayer perceptron neural network (MLP). The system and method can adaptively adjust the parameters of transport and application layers according to wireless network conditions, based on video distortion estimation using MLP neural network. The system includes a video motion and detail estimation block, a redundancy and video bitrate optimizer, a MLP neural network-based video distortion estimator, and video transport blocks, a packet error rate (PER) and bandwidth measurement block.

2 Claims, 3 Drawing Sheets

SYSTEM AND METHOD FOR ADAPTIVE LIVE VIDEO STREAMING BASED ON DISTORTION ESTIMATION USING MULTILAYER PERCEPTRON NEURAL NETWORK

TECHNICAL FIELD OF THE INVENTION

The inventions presents a system and method for live video streaming over tactical wireless networks based on distortion estimation using multilayer perceptron neural network (MLP).

BACKGROUND OF THE INVENTION

Due to the error-prone and unstable nature of wireless networks (especially tactical networks), the live video streaming over such environments often leads to unsatisfactory video quality. The video quality combines two factors: one is video distortion resulting from the packet error during streaming process over wireless networks; second is video unsmoothness resulting from the fact that the video bitrate (i.e., compression factor configured by the video encoder) is higher than the current channel bandwidth. Therefore, in order to improve the quality of live video streaming over the wireless networks, several optimization solutions at the various layers of protocol stack have been proposed.

The solutions at the application layer focus on the adjustment of video bitrate based on the bandwidth measurement at the receiver side. The video bitrate is adjusted based on a preconfigured table, which maps the measured bandwidth to the video bitrate or a neural network model, which is trained to predict the optimal video bitrate from measured bandwidth. The solutions at the physical layer focus on forward error correction (FEC) code, which is used to reduce the packet error rate during the packet transmission over wireless networks. However, these solutions are only optimal at one specific network layer.

Several cross-layer solutions have been proposed to perform optimization at the various network layers at the same time. For example, a cross-layer solution adaptively adjusts the transport layer parameters (e.g., the number of packet retransmissions) based on the video content and packet error rate of channel. The optimization model used to select the number of packet retransmission is based on the math formulae for estimating distortion. The formulae do not take into account the various encoder settings and the motion and detail of video. The factors also have impact on the video distortion value when streaming over wireless networks. For example, the video with high motion and detail often has less distortion than that with low motion and detail under the same condition of packet error rate. Therefore, a more optimal cross-layer solution is required to perform the live video streaming over wireless networks. In this invention, the authors devised a cross-layer solution, which adaptively configures various redundancy models for each video frame based on the frame importance and adjusts video bitrate to optimize the video distortion and guarantee the video smoothness. Our solution features an optimization algorithm, which determines the redundancy model and video bitrate based on the distortion estimation using multilayer perceptron (MLP) neural network.

BRIEF SUMMARY OF THE INVENTION

The invention proposes a system, which can adjust adaptively the parameters of transport layer and application layer according to the various wireless network conditions, based on the video distortion estimation using MLP neural network. The system consists of the video motion and detail estimation block, the redundancy and video bitrate optimizer, the MLP neural network-based video distortion estimator, and video transport blocks, packet error rate (PER) and bandwidth measurement block.

Specifically, the system adaptively adjusts the video bitrate and redundancy models of video frames according to the measured channel bandwidth, packet error rate, motion and detail level of video for the purpose of optimizing the video quality during the live streaming.

The invention proposes an optimization model, which determines the optimal video bitrate and redundancy models for video frames according to the channel conditions. The invention proposes a video distortion estimator with the input of channel condition, video bitrate, redundancy models, motion and detail of video sequence. The invention also proposes a method, which trains the MLP neural network-based distortion estimator using the simulation data. The invention proposes the format of transport message used to encapsulate the video data and format of redundancy configuration message to enable the adaptive live video streaming function.

DETAILED DESCRIPTION OF THE INVENTION

Figure 1:
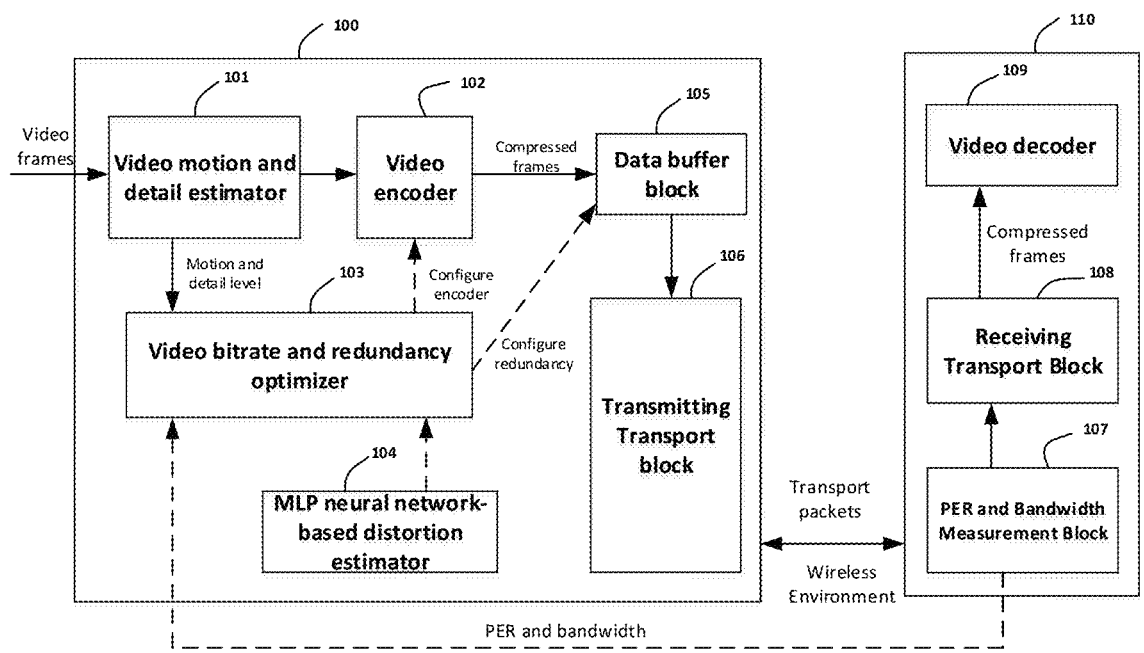
FIG. 1: illustrates the architecture of adaptive live video streaming system.

Optimization for video streaming over wireless networks can be performed at various protocol layers. In this invention, the optimization is done at both application and transport layers. At the application layer, video frames are compressed using popular video compression standards such as H264 or H265 with a channel-appropriate bitrate. At the transport layer, the compressed video frames are encapsulated into transport packets and sent to lower layers for further process (e.g. network layer for addressing, medium access control (MAC) layer for accessing the channel, and the physical layer for adding error-correcting code and modulating before transmitting it out into the air). Due to the nature of wireless environment, these transmitted data packets would be erroneous or lost and this can lead to video distortion at the receiver side. There are various mechanisms used to prevent packet errors when transmitting over wireless networks: redundant transmission, error correction code, and retransmissions. Due to the latency requirement of the live streaming, video streaming protocols do not often employ retransmission mechanisms. Error-correcting code are often used in the MAC or physical layer. Redundant transmission is a method to reduce the packet failure probability at the receiver side over the unstable wireless channels. At application layer, raw video frames are compressed into I, B, and P frames. The I frame is a compressed video frame using only intra-prediction algorithm, so when received an I video frame, the receiver can uncompress it without using the reference frame. The P and B frames are compressed video frames that use both intra-prediction and inter-prediction algorithms to perform compression. Therefore, the receiver needs previous reference frames (e.g. I reference frame if it is a P frame or I, P reference frames if it is a B frame) to perform the decompression. For that reason, I, P or B frames have the different importance from each other. Therefore, in order to optimize video quality, the transmitter will transmit the I, P, B video frames with different redundancy levels depending on the importance of these I, P, B frames. The I frame is the most important frame and should be transmitted most, while the B frame is the least important frame, and should be transmitted least. However, to guarantee smooth video streaming, the video bitrate needs to be adjusted so that the total bitrate generated after using the redundancy models and protocol header overhead is always smaller than the current channel bandwidth. The video distortion at the receiver side is resulted from both video compression and packet error when streaming over the wireless networks, the frame redundancy levels and video bitrate should be chosen carefully and optimally to ensure that the total video distortion caused by the packet error and video compression is minimized. The invention describes a method to select redundancy levels for each type of frame and video bitrate configured by video encoder adaptively with the channel condition for the purpose of optimizing the video quality at the receiver.

A block diagram of an exemplary adaptive video streaming system is shown in FIG. 1. The block 100 is video transmitter and block 110 is video receiver. The video transmitter uses the video encoder to compress video frames and encapsulate compressed video frames into transport packets for transmitting. The video transmitter employs MLP neural network-based distortion estimator to find optimal values for video bitrate and redundancy levels. The video receiver will receive these transport packets and discard of duplicate packets and transport header part to obtain compressed video frames. The video frames will then be uncompressed using the video decoder block. The video receiver also measures and feedback the PER and bandwidth information back to the video transmitter.

The video transmitter 100 consists of following blocks:

Motion and detail estimator 101: the input of this block is uncompressed video frames obtained from the camera device, the output is the estimated value of video motion and detail level.

Video encoder 102: the input of this block is uncompressed video frames and output is video frames, which are compressed into I, P, B frames according to the H264 or H265 compression standard. This encoder block is commonly available and not presented in detail in this disclosure.

Video data buffer 105: this block is used to store compressed video frames and from video encoder block and redundancy configuration messages from video bitrate and redundancy optimizer.

Video bitrate and redundancy optimizer 103: the input of this block includes the video motion and detail level from block 101, the packet error rate (PER) and bandwidth measured from the feedback of the video receiver. The output of this block is the optimal video bitrate and the redundancy level for each type of video frame. The optimizer block configures the redundancy level for each type of video frame using a configuration message with the format shown in FIG. 3.

MLP neural network-based distortion estimator block 104: the input of block includes the redundancy configuration for each video frame type, video bitrate value, video motion and detail level, video settings (video size and group of pictures), packet error rate and channel bandwidth. The output will be the estimated distortion value corresponding to the above set of parameters.

Figure 2:
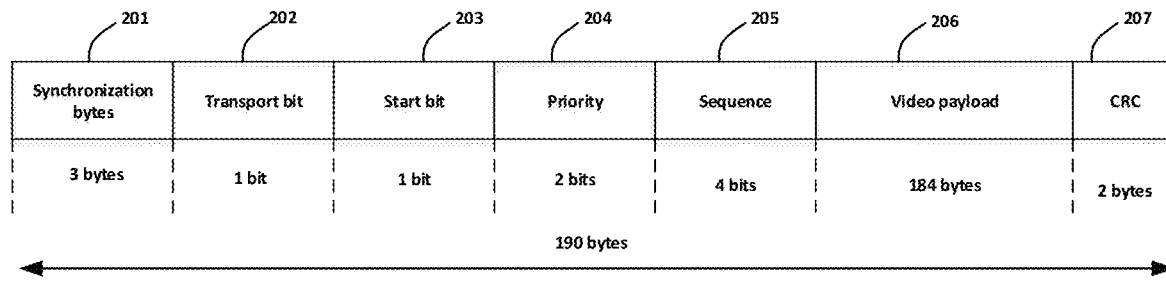
FIG. 2: illustrates the format of video transport message.

Transmitting transport block 106: this block will get data from data buffer block 105 including redundancy level configured by video bitrate and redundancy optimizer 103 and compressed video frames from video encoder 102. This block encapsulates video frames with the transport header as shown in FIG. 2, generates redundant packets according to configured redundancy from block 103 and sends them down to the lower protocol layers to transmit to the receiver side.

The video receiver 110 consists the following blocks:

PER and bandwidth measurement block 107: this block is responsible for measuring the bandwidth of the channel and the packet error rate at the receiver side.

Receiving transport block 108: This block is responsible for detecting duplicate packets and decapsulates the transport header to get the video data and then sends them to the video decoder.

Video decoder 109: this block will perform the decompression of video frames according to preconfigured standard (e.g., H264). This decoder is commonly available and not presented in detail in this disclosure.

A. Motion and Detail Estimator

Step 1: Calculate the average difference between two consecutive video frames.

The input of the motion and detail estimation block is the uncompressed video frames obtained from the camera device. Motion and detail level between two consecutive video frames can be estimated using the following formula:

$$MAD_n = \frac{\Sigma_{i \in W} \Sigma_{j \in H} |B_n(k, j) - B_{n-1}(i, j)|}{W * H} \quad (1)$$

Where $MAD_n$ is the mean absolute difference between two consecutive frames. W is the width and H is the height of the video frame. $B_n(i,j)$ is image pixel value.

Step 2: The motion and detail of video sequence can be estimated using the weighted average formula.

$$MD_n = \alpha * MAD_n + (1-\alpha) * MAD_{n-1} \quad (2)$$

Where $MAD_n, MAD_{n-1}$ are the mean difference of the last two video frames and the mean difference of the previous video frames.

B. Video Encoder

The video encoder block is responsible for compressing raw video frames according to well-known compression standards such as H264 or H265. The output is compressed I, P, B video frames. The video bitrate, video size, and group of pictures (i.e., define the number and order of I, P, B frames) are configurable parameters of the encoder.

C. Video Data Buffer Block

The data buffer block is used to store compressed video frames from the video encoder and redundancy configuration messages sent from the video bitrate and redundancy optimizer to the transport block.

D. MLP Neural Network-Based Distortion Estimator

Figure 4:
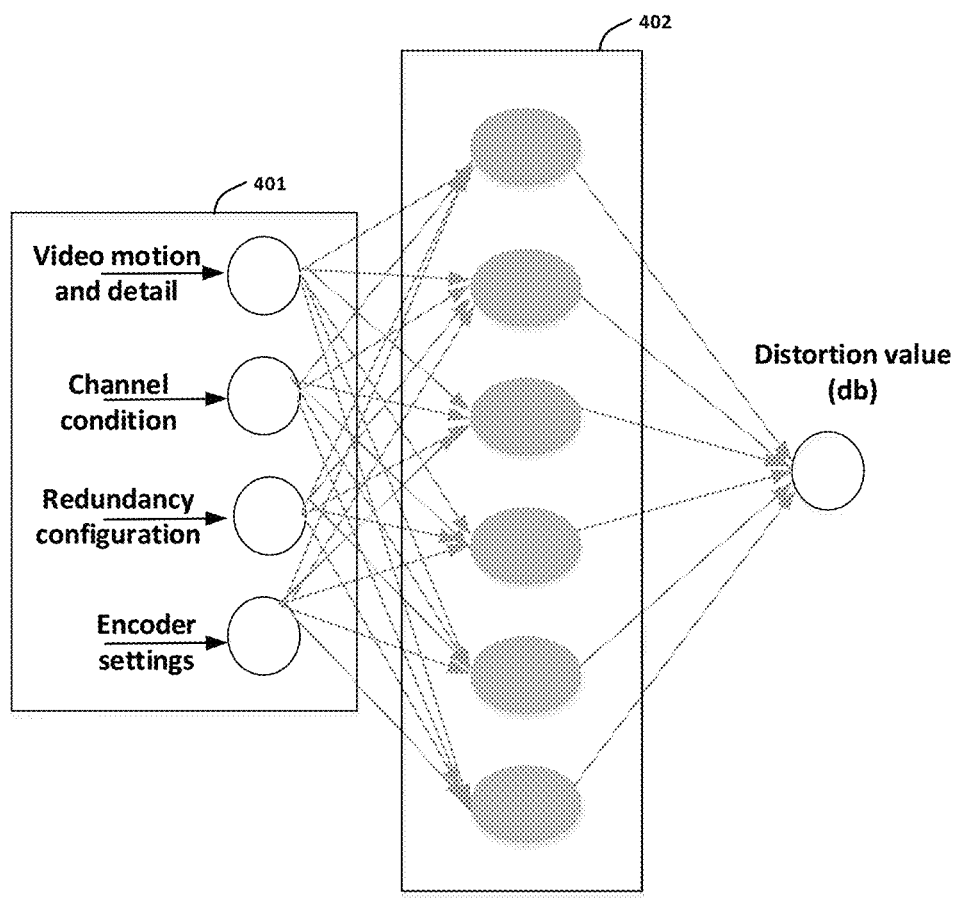
FIG. 4: illustrates the architecture of MLP neural network-based distortion estimator.

The distortion estimator is built based on the MLP (multi-layer perceptron) neural network architecture as shown in FIG. 4. The input 401 for the MLP neural network includes the video motion and detail level, the channel condition (packet error rate and measured bandwidth), redundancy level for each type of frame, and encoder settings (i.e., video size and group of pictures). The MLP neural network consists of layers and network nodes 402. The number of MLP layers is set to 3 and the number of network nodes for each layer is set to 32. The output is the video distortion value (dB) corresponding to the input parameter set.

To generate training data for this MLP neural network, a video streaming system is implemented over a simulated wireless channel. We generate test video sequences and calculate motion and detail level of each video sequence, compress video sequences with various bitrate, and stream these video sequences through a simulated wireless channel with various bandwidth and packet error rate. After received the video frames at the receiver, the video distortion value compared to the original video will be calculated using the following formulae:

$$MSE = \Sigma_{i \in W} \Sigma_{j \in H} (B_{Decoded}(i, j) - B_{Original}(i, j))^2 \quad (3)$$

$$PSNR = 10 * \log_{10}\left(\frac{MAX_f}{\sqrt{MSE}}\right) \quad (4)$$

Where W is the width and H is the height of video frame. $B_{Decoded}(i,j)$, $B_{Original}(i,j)$ are the image pixel value of original video frame and compressed video frame at the receiver side. MAX is the maximum pixel value in the original video frame. PSNR (Picture signal to noise ratio or video distortion) is calculated for each pair of original video frame and received video frame. These PSNR values are then averaged as the average distortion value for the entire video sequence. By using this method, we can build a training data set with the input including video motion and detail, channel condition, redundancy level, encoder setting and the output is the corresponding distortion value. This data set then is used to train the MLP neural network. As a result, the trained MLP neural network can be used to predict video distortion value.

E. Video Bitrate and Redundancy Optimizer

Figure 5:
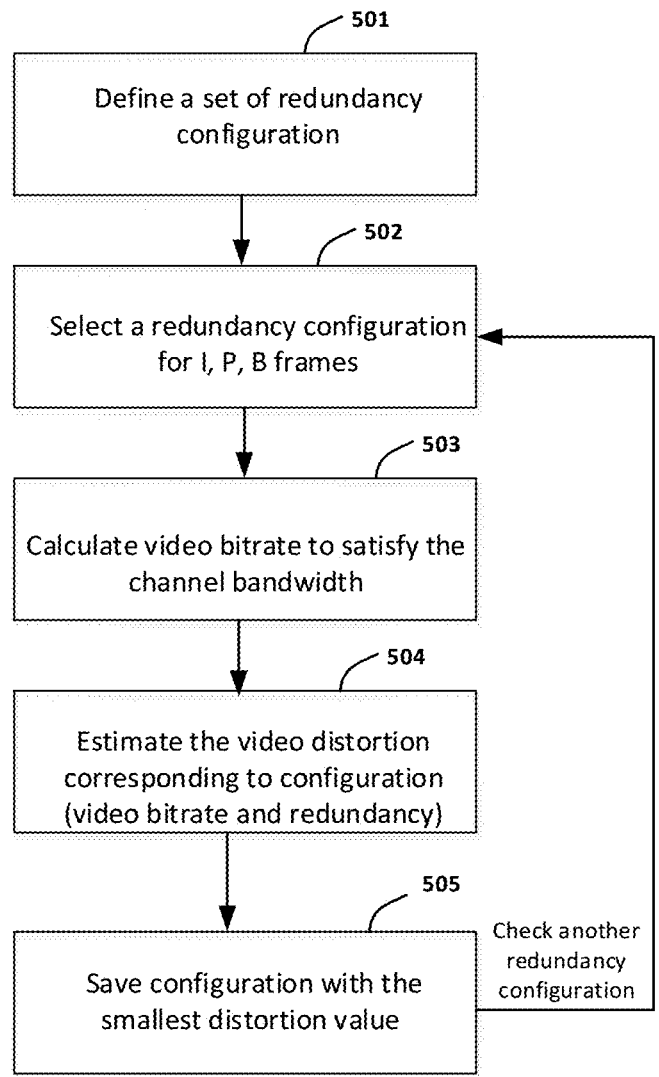
FIG. 5: illustrates the optimization algorithm, which is used to find the optimal video bitrate and redundancy configuration.

FIG. 5 describes an algorithm for choosing optimal video bitrate and redundancy levels for each type of frame using in block 103.

Step 1 (Block 501): Define a set of redundancy configuration (e.g., redundancy level set for each type of I, P, B frame). In order to speed up the algorithm, the authors suggest to use initial redundancy values based on packet error rate as in the following table.

| PER | Set of initial redundancy values for each type of frame |
|---|---|
| PER < 15% | I = [1, 2, 3, 4]; P = [1, 2, 3]; B = [1] |
| 15% < PER < 30% | I = [2, 3, 4]; P = [1, 2, 3, 4]; B = [1] |
| 30% < PER < 50% | I = [3, 4, 5]; P = [3, 4, 5]; B = [1, 2] |
| PER > 50% | I = [4, 5, 6, 7]; P = [3, 4, 5, 6]; B = [3, 4, 5] |

Step 2 (Block 502, 503): Select one of redundancy configurations and estimate the video bitrate using the following formula:

$$VBR = \frac{BW_{channel}\left(1 - \frac{L_{header}}{L_{packet}}\right)}{MAX_{redundancy}} \quad (5)$$

Where VBR is the estimated video bitrate for the encoder to ensure smooth video streaming. $BW_{channel}$ is the measured bandwidth at the receiver side. $L_{header}$, $L_{packet}$ are the length of header and the length of entire packet. $MAX_{redundancy}$ is the maximum redundancy level.

Step 3 (Block 504): Estimate the distortion value using the MLP neural network-based estimator 104 with the above calculated video bitrate, selected redundancy level, the calculated video motion and detail value, the measured PER and bandwidth.

Step 4 (Block 505): Repeat step 2 and 3 to calculate the distortion video value of different redundancy configuration. We repeat step 2 and 3 until all redundancy configurations in the initial set are checked. We then select the redundancy configuration and video bitrate value with the smallest distortion as optimal value.

Figure 3:
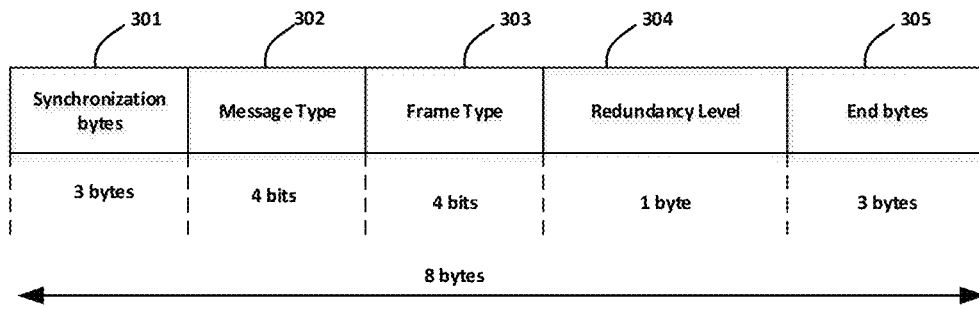
FIG. 3: illustrates the format of redundancy configuration message.

After having found the optimal values for video bitrate and redundancy level, each subsequent video frames, the optimizer will check whether the video frames are I, P, or B, and send a configuration message with the format as shown in FIG. 3 to data buffer 105. The transmitting transport block will read the configuration message and create redundant packets accordingly. The fields of the configuration message include:

Field 301: Synchronization bytes
Field 302: Configuration message type
Field 303: I, P, or B video frame type
Field 304: Redundancy level
Field 305: End bytes F. Transmitting Transport Block Transmitting transport block 106 reads the messages from data buffer block 105. If the message is configuration type, redundancy level for corresponding frame type will be updated. Then, transmitting transport block encapsulates 184 bytes of data video into a transport packet constructed as shown in FIG. 2. Transport packet has the following fields:

Field 201: Synchronization bytes
Field 202: Set to 1 if data packet has incorrect CRC
Field 203: Set to 1 to indicate the start of video frame
Field 204: Priority level of transport packet
Field 205: The sequence number of frame is marked from 0 to 15
Field 206: 184 bytes of video data
Field 207: CRC code to check whether transport packet is correct After that, transport packets are generated according configured redundancy levels and sent to the buffer of the lower protocol layer to transmit over the air.

G. Receiving Transport Block

The receiving transport block receives the transport packets. Based on CRC and sequence number of frame, the receiving transport block can detect duplicated and wrong packets. Then the video data payload is sent to the video decoder block 109.

H. PER and Bandwidth Measurement Block

Method of measuring PER and bandwidth consists of 2 steps:

Step 1: Eliminate the outlier data values.

The instant packet error value $PER_{instant}$ is measured every 1000 transport packets and the instant bandwidth $BW_{instant}$ is measured by the number of bytes received in one second period. The $PER_{instant}$ and BW instant values are measured continuously and processed to eliminate outlier values. A history of the last 20 measurement values is stored and used to calculate the mean and standard deviation. If the instant value is in the range [mean−2*std, mean+2*std], where mean is the mean of the last 20 measured values and std is the standard deviation, the instant value is considered as valid value.

Step 2: Estimate the packet error rate PER and bandwidth using the weighted average formulae.

PER and bandwidth are estimated using the following formulae:

$$PER_{measure} = PER_{instant} * \beta + PER_{previous} * (1 - \beta) \quad (6)$$

$$BW_{measure} = BW_{instant} * \beta + BW_{previous} * (1 - \beta) \quad (7)$$

Where $PER_{measure}$, $BW_{measure}$ are the packet error rate and the bandwidth needed to measure. $PER_{previous}$, $BW_{previous}$ are the packet error value and bandwidth calculated previously. The $\beta$ is the weight coefficient, which can be adjusted based on experimentation.

I. Video Decoder Block

The video decoder block will obtain the compressed video frames from the receiving transport block 108 and decompress video frames following preconfigured compression standard (the same as that is used at transmitter side).

The invention claimed is:

1. System for adaptive live video streaming based on distortion estimation using multilayer perceptron neural network MLP neural network, comprising:
a video motion and detail estimator which takes the video frames from a camera device and calculates the motion and detail level of video frames using formulae (1) and (2), $$MAD_n = \frac{\Sigma_{i \in W} \Sigma_{j \in H} |B_n(k, j) - B_{n-1}(i, j)|}{W * H} \quad (1)$$

$$MD_n = \alpha * MAD_n + (1 - \alpha) * MAD_{n-1} \quad (2)$$

a multilayer perceptron neural network neural network-based distortion estimator which is a multilayer perceptron neural network, which is trained based on simulation data of video streaming, taking inputs of the motion and detail level of video frames, a channel condition (a packet error rate and a channel bandwidth), redundancy levels of I, P, B frames, and encoder settings (video size, group of picture structure), the output of the estimator is a distortion value;
a video bitrate and redundancy optimizer which performs an optimization algorithm using the distortion estimator to determine optimal parameters for video bitrate and redundancy levels to guarantee video quality when streaming live video over a wireless channel with a packet error rate and a channel bandwidth;
a transmitting transport block which encapsulates compressed video frames into transport packets and performs redundancy configurations calculated by the video bitrate and redundancy optimizer;
a receiving transport block which analyses transport packet packet headers to detect duplicate and wrong packets and sends a video payload to a video decoder; and
a packet error rate and bandwidth measurement block which block measures the packet error rate and channel bandwidth using steps presented above.

2. A methods for adaptive live streaming with channel condition, comprising
a method for measuring packet error rate and channel bandwidth at the receiver side,
consisting of two steps:
eliminate data outliers based on the history of measure points step,
estimate packet error rate and bandwidth using weighted average formulae step;
a method for calculating the motion and detail level of video,
consisting of two steps:
calculate the mean absolute difference of two consecutive video frames step,
estimate using weighted average formulae for video sequence step;
a method for adjusting video bitrate and redundancy levels of video frames according to the packet error rate and channel bandwidth, and video motion and detail level, comprising,
Step 1: define a set of initial redundancy configurations for each type of video frames,
Step 2: select one redundancy configuration and estimate an appropriate video bitrate for measured channel bandwidth,
Step 3: estimate video distortion with selected redundancy and video bitrate using pretrained multilayer perceptron neural network MLP neural network-based distortion estimator,
Step 4: select video bitrate and redundancy configuration with the smallest distortion as optimal values;
a method for creating multilayer perceptron neural network neural network-based distortion estimator,
consisting of three steps:
implement the video streaming system over a simulated wireless channel,
run simulation with various redundancy configuration, video bitrate, channel condition, encoder settings, and calculate the distortion value according to the following formulae (3) (4), $$MSE = \Sigma_{i \in W} \Sigma_{j \in H} (B_{Decoded}(i, j) - B_{Original}(i, j))^2 \quad (3)$$

$$PSNR = 10 * \log_{10}\left(\frac{MAX_f}{\sqrt{MSE}}\right) \quad (4)$$

construct multilayer perceptron neural network neural networks with two layers and each layer having 32 nodes, and train the multilayer perceptron neural network neural networks with obtained data from a simulation system;
a method for encapsulating video frames and configuring redundancy levels, comprising
define format of transport message for the purpose of detecting duplicate and wrong transport packets,
define format of configuration message for purpose of sending redundancy configuration of each type of video frame to a transport block.

* * * * *